(12) United States Patent
Chang

(10) Patent No.: US 7,724,446 B2
(45) Date of Patent: May 25, 2010

(54) ZOOM LENS SYSTEM

(75) Inventor: Yu-min Chang, Tantz Shiang (TW)

(73) Assignee: Asia Optical Co., Inc, Taichung (TW)

( * ) Notice: Subject to any disclaimer, the term of this patent is extended or adjusted under 35 U.S.C. 154(b) by 149 days.

(21) Appl. No.: 12/030,617

(22) Filed: Feb. 13, 2008

(65) Prior Publication Data

US 2008/0192360 A1    Aug. 14, 2008

(30) Foreign Application Priority Data

Feb. 14, 2007    (TW) .............................. 96105527 A

(51) Int. Cl.
*G02B 15/14* (2006.01)
(52) U.S. Cl. ...................... 359/676; 359/684
(58) Field of Classification Search ................. 359/676, 359/680–682, 684
See application file for complete search history.

(56) References Cited

U.S. PATENT DOCUMENTS 5,416,639 A * 5/1995 Yamanashi .................. 359/683
6,285,509 B1 * 9/2001 Nakayama et al. .......... 359/676
7,369,322 B2 * 5/2008 Souma ........................ 359/680
7,576,923 B2 * 8/2009 Inoko .......................... 359/680
2007/0229967 A1 * 10/2007 Nagahara .................... 359/676

* cited by examiner

*Primary Examiner*—Jordan M. Schwartz

(57) ABSTRACT

A zoom lens system includes, in order from an object side to an image side, first to fifth lens groups respectively having negative, positive, negative, positive, and positive refractive power. During zooming from a wide-angle end to a telephoto end, the second and third lens groups are moved independently toward the object side with spacing therebetween increased and that between the first and second lens groups decreased. The following condition is satisfied $1.05 \leq (f_W \cdot L_W)/(f_T \cdot Y) \leq 1.53$, wherein $f_W$ and $f_T$ are focal lengths of the zoom lens system at the wide-angle end and the telephoto end, Y represents a maximum diagonal length of an image plane, and $L_W$ represents a total length of the zoom lens system at the wide-angle end which is defined as a distance from the vertex of a first surface of the first lens on the object side to the image plane.

22 Claims, 11 Drawing Sheets

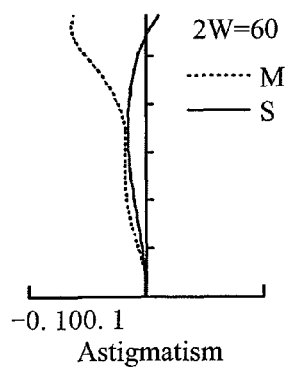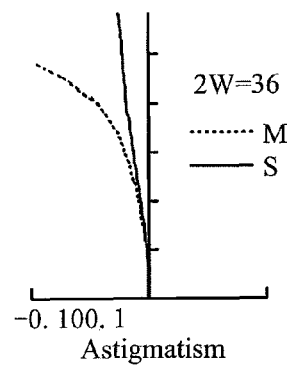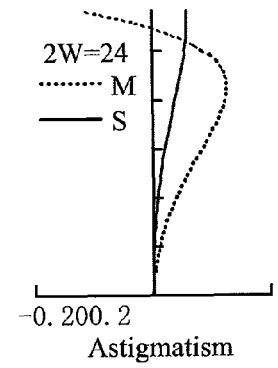
FIG. 2A  FIG. 2B  FIG. 2C
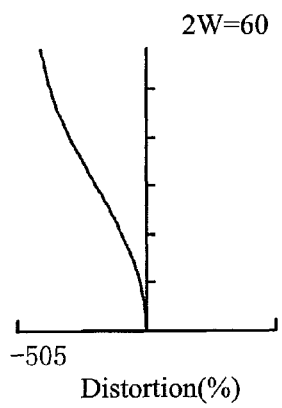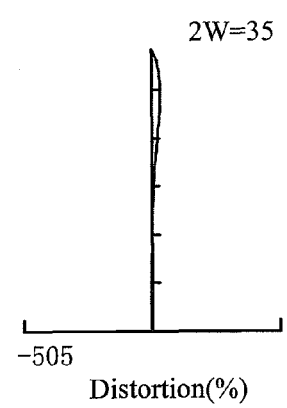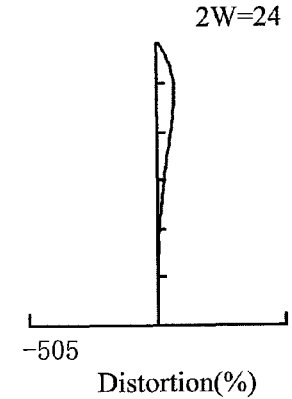
FIG. 3A  FIG. 3B  FIG. 3C
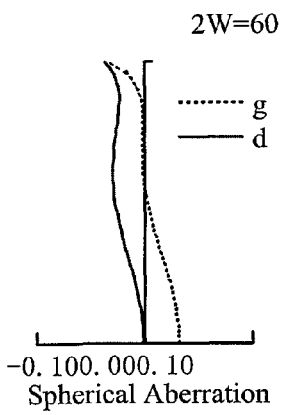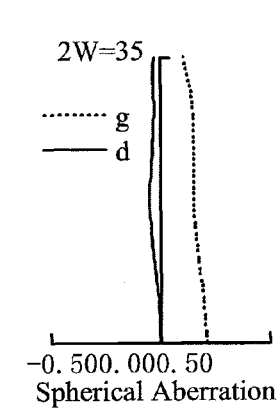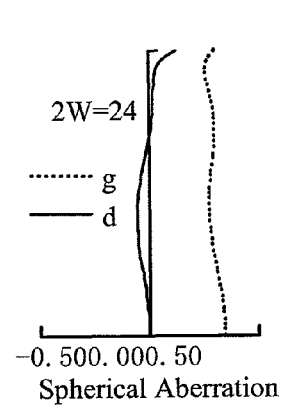
FIG. 4A  FIG. 4B  FIG. 4C

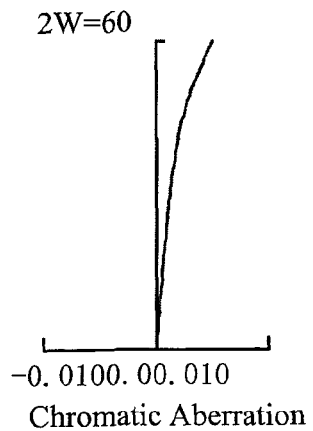
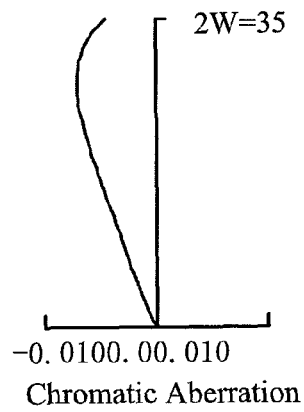
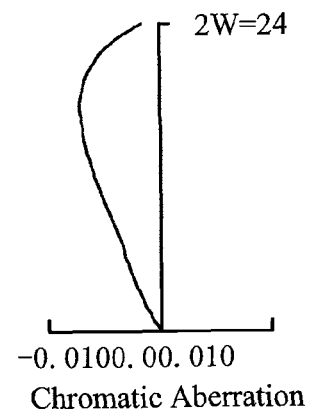
FIG. 5A  FIG. 5B  FIG. 5C
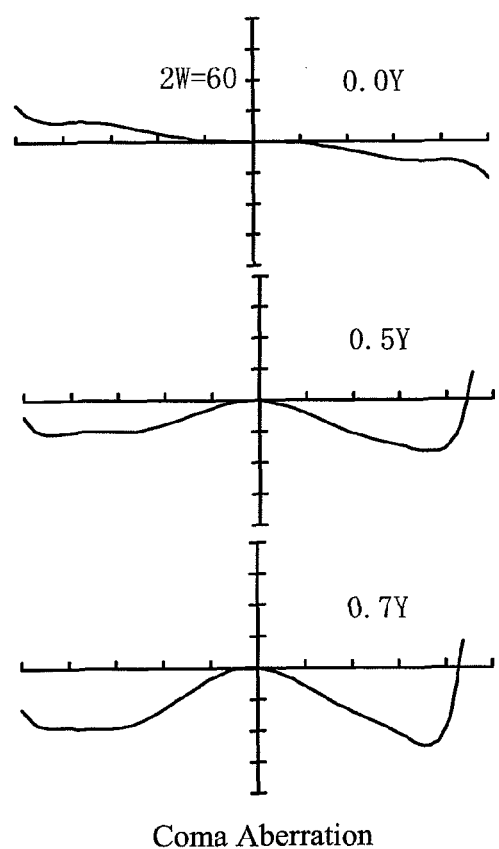
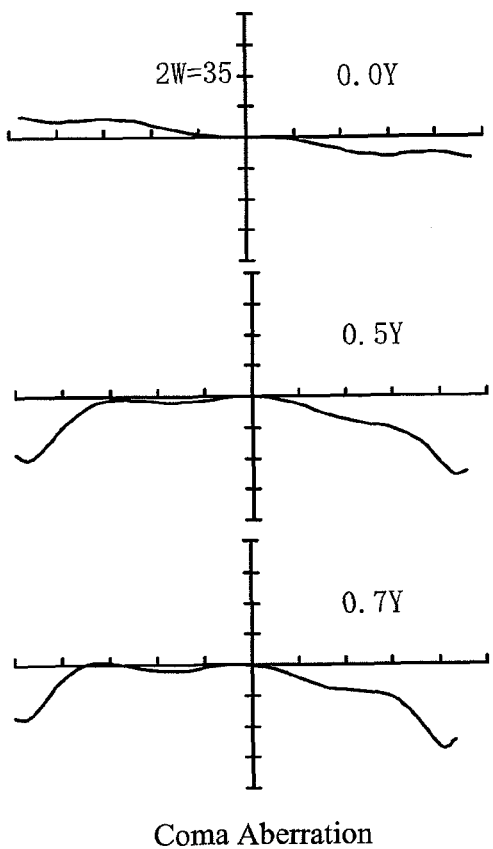
FIG. 6A  FIG. 6B

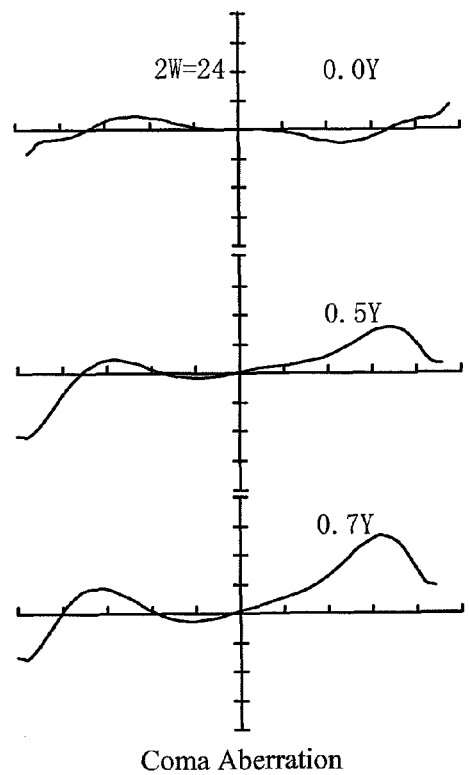
FIG. 6C
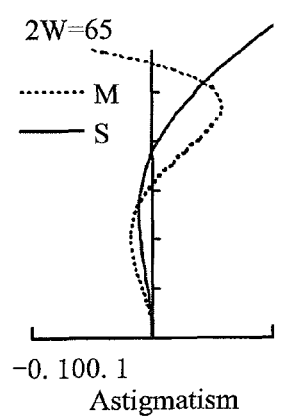 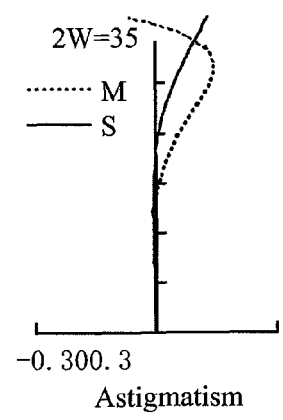 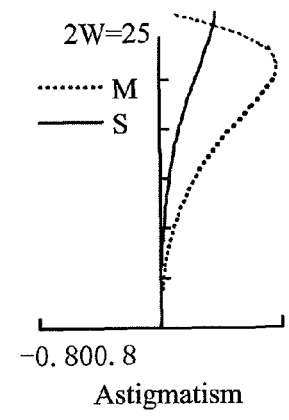
FIG. 7A  FIG. 7B  FIG. 7C

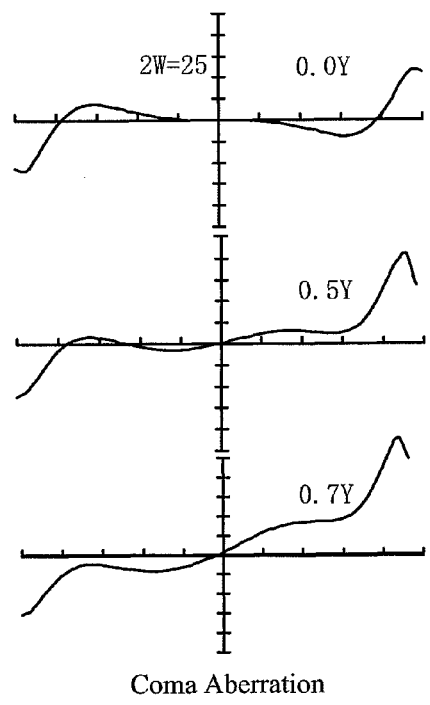
Coma Aberration
FIG. 11C
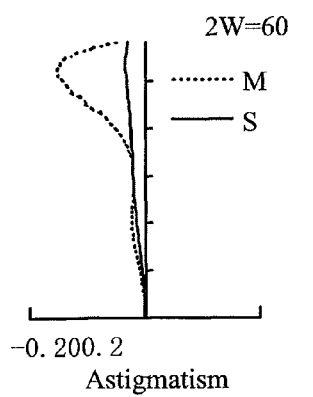 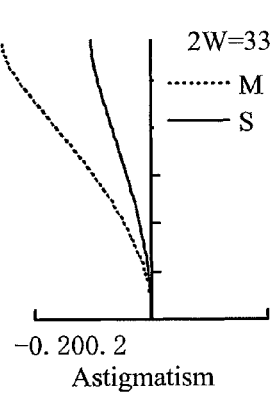 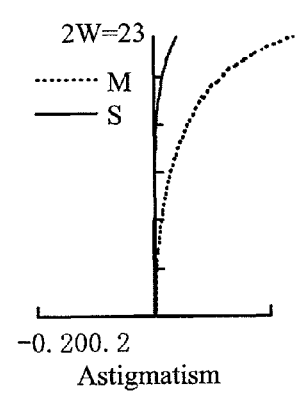
FIG. 12A   FIG. 12B   FIG. 12C

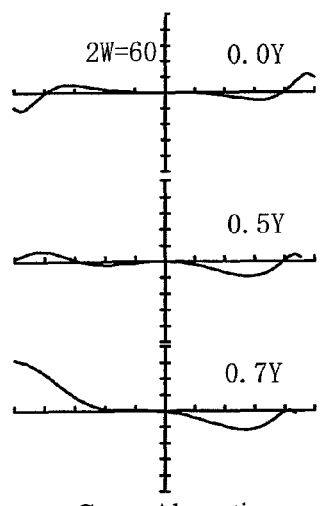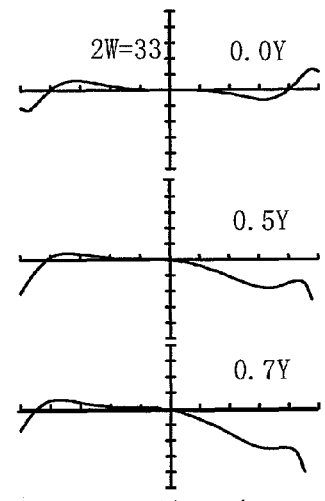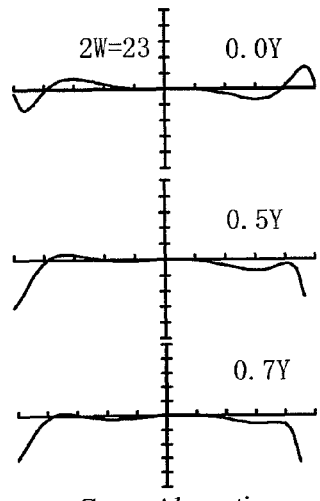
Coma Aberration
FIG. 16A
Coma Aberration
FIG. 16B
Coma Aberration
FIG. 16C
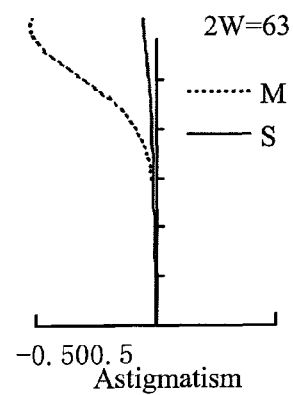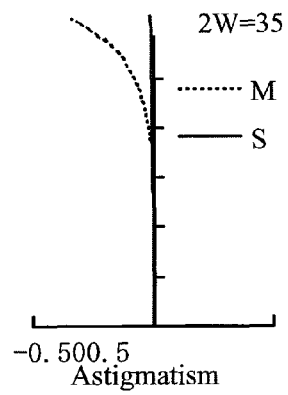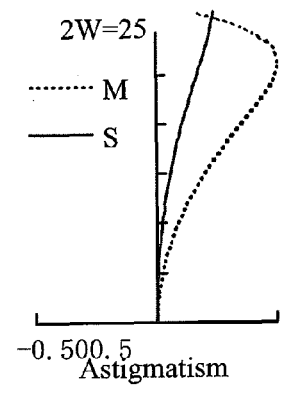
FIG. 17A  FIG. 17B  FIG. 17C
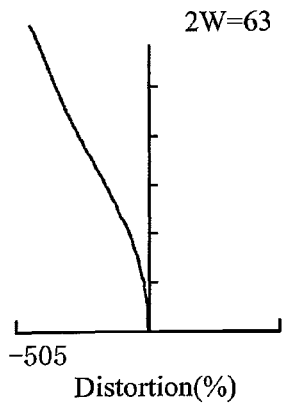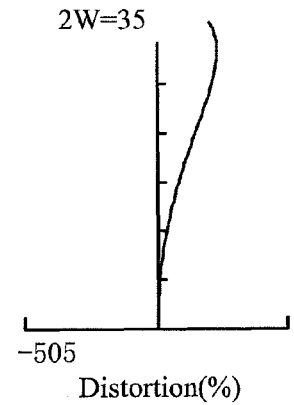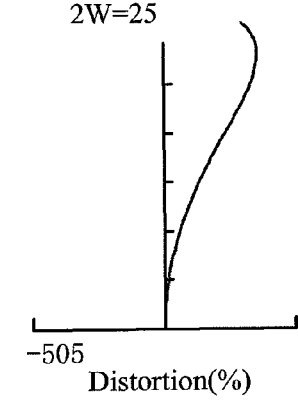
FIG. 18A  FIG. 18B  FIG. 18C

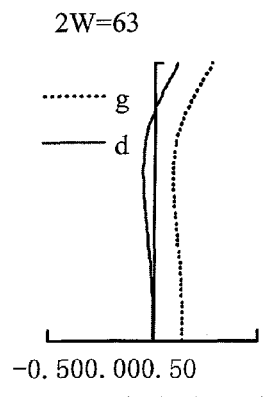
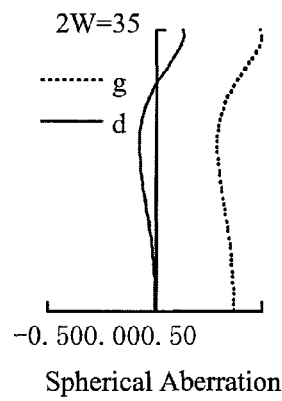
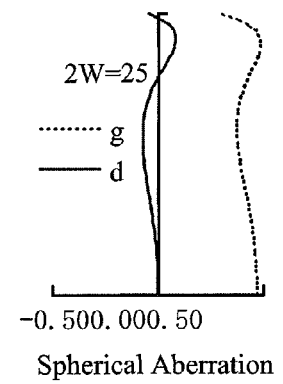
FIG. 19A   FIG. 19B   FIG. 19C
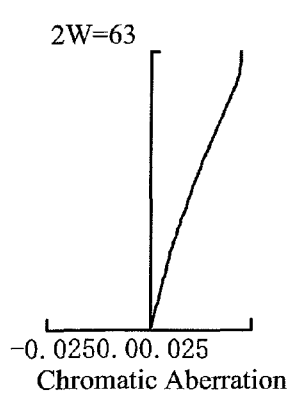
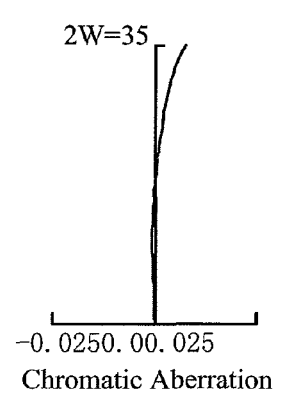
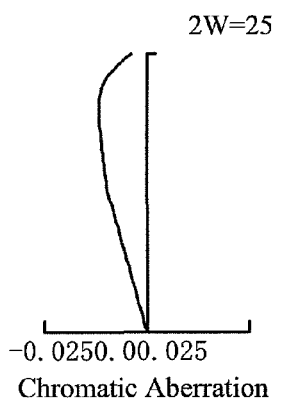
FIG. 20A   FIG. 20B   FIG. 20C Coma Aberration Coma Aberration Coma Aberration

ZOOM LENS SYSTEM

BACKGROUND OF THE INVENTION

1. Field of the Invention

The present invention relates to a zoom lens system, and particularly to a small-size and low-cost zoom lens system for forming a real image on a digital or non-digital image pickup device of a camera.

2. Description of Prior Art

In recent years, most electronic devices, such as mobile phones, personal digital assistants (PDAs) and notebook computers, have been integrated with a photographic lens module for effecting the photographic function. Such a photographic lens module is generally required to be small in size and light in weight for portability, while providing a high level of image resolution. To satisfy these requirements, a conventional photographic lens module generally consists of three lens groups.

With the development of semiconductor technology, aspheric lens elements have been widely used in a photographic lens module. Conventionally, a photographic zoom lens system generally employs three lens groups in a negative-positive-positive refractive power configuration, wherein two of the three lens groups are movable for realizing zooming. However, the movement ranges of the two movable lens groups are relatively large, and the imaging performance dramatically varies with the increase of zoom ratio. To overcome these disadvantages, a zoom lens system consisting of four lens groups has been introduced. However, the employment of four lens groups leads to increase in the number of constituent lens elements and thus increase in manufacturing costs. Therefore, how to provide a high-resolution image with a minimum number of the component lens elements so as to still satisfy the compactness requirement is a challenge to be addressed in the art.

Hence, an improved zoom lens system, which is compact in size and low in cost while ensuring a high level of image performance, is desired to overcome the above problems encountered in the prior art.

SUMMARY OF THE INVENTION

An object of the present invention is to provide a zoom lens system having a negative-positive-negative-positive-positive refractive power configuration to provide a high level of image performance, the zoom lens system also being low in cost and small in size.

To achieve the above object, the present invention provides a zoom lens system comprising, in order from an object side to an image side, a first lens group having negative refractive power, a second lens group having positive refractive power, a third lens group having negative refractive power, a fourth lens group having positive refractive power and a fifth lens group having positive refractive power. The first, second and third lens groups are movable along an optical axis for zooming; the fourth lens group is also movable along the optical axis but functioning for focusing; and the fifth lens group is kept stationary with respect to the optical axis. An aperture stop is disposed between the first and second lens groups.

The present zoom lens system satisfies the following condition:

$$1.05 \le \frac{f_W \cdot L_W}{f_T \cdot Y} \le 1.53$$

where $f_W$ represents the focal length of the present zoom lens system at a wide-angle end, $f_T$ represents the focal length of the present zoom lens system at a telephoto end, Y represents a maximum diagonal length of the image plane, and $L_W$ represents a total length of the present zoom lens system at the wide-angle end which is defined as a distance from the vertex of a first surface of the first lens on the object side to the image plane.

The first lens group of the present zoom lens system consists of one lens having two aspheric surfaces. This lens may be made of plastic material, and has an Abbe number equal to or larger than 63. The second lens group also consists of one lens having two aspheric surfaces. The third lens group consists of a biconvex lens and a biconcave lens cemented with each other to form a spherical cemented lens. The fourth lens group consists of one lens that may be made of plastic or glass. The fifth lens group consists of one aspheric lens that may also be made of plastic or glass.

The aspheric lens of the fifth lens group satisfies the following condition:

$$0.9 \le \frac{L_W}{f_{L6}} \le 1.3$$

where $f_{L6}$ represents the focal length of the aspheric lens of the fifth lens group, and $L_W$ represents the total length of the present zoom lens system at the wide-angle end.

When zooming from the wide-angle end to the telephoto end, both the second and third lens groups of the present zoom lens system are moved independently toward the object side, and the first lens group is first moved independently toward the image side and then moved toward the object side, so that the spacing between the first and second lens groups is decreased and the spacing between the second and third lens groups is increased.

Alternatively, the first lens group may be fixed during zooming. That is, the first lens group does not contribute to the zooming action.

For short-distance focusing, the fourth lens group is moved independently toward the object side to approach the third lens group, whereby the spacing between the third and fourth lens groups is decreased. The fourth lens group also may serve as a compensating lens to compensate for a shift in the focal plane due to a variation in magnification during zooming. This focusing and compensating fourth lens group is moved together with the first and second lens groups during the zooming operation, and then moved independently for effecting the focusing operation.

By the employment of the five lens group arrangement that has a negative-positive-negative-positive-positive refractive power configuration and that consists of only six constituent lens elements, the zoom lens system of the present invention provides the advantages of small size and low cost as compared to the conventional designs, while ensuring a high level of image performance. In addition, all the constituent lens elements of the present zoom lens system may be made of plastic materials, and this further reduces costs of the lens system.

BRIEF DESCRIPTION OF THE DRAWINGS

The present invention may be best understood through the following description with reference to the accompanying drawings, in which:

FIGS. 2A-2C are respective graphic representations of astigmatism aberration according to Numerical Embodiment 1 of the present invention at the wide-angle end, the intermediate position and the telephoto end;

FIGS. 3A-3C are respective graphic representations of distortion aberration according to Numerical Embodiment 1 of the present invention at the wide-angle end, the intermediate position and the telephoto end;

FIGS. 4A-4C are respective graphic representations of spherical aberration according to Numerical Embodiment 1 of the present invention at the wide-angle end, the intermediate position and the telephoto end;

FIGS. 5A-5C are respective graphic representations of chromatic aberration according to Numerical Embodiment 1 of the present invention at the wide-angle end, the intermediate position and the telephoto end;

FIGS. 6A-6C are respective graphic representations of coma aberration according to Numerical Embodiment 1 of the present invention at the wide-angle end, the intermediate position and the telephoto end;

FIGS. 7A-7C are respective graphic representations of astigmatism aberration according to Numerical Embodiment 2 of the present invention at the wide-angle end, the intermediate position and the telephoto end;

FIGS. 11A-11C are respective graphic representations of coma aberration according to Numerical Embodiment 2 of the present invention at the wide-angle end, the intermediate position and the telephoto end;

FIGS. 12A-12C are respective graphic representations of astigmatism aberration according to Numerical Embodiment 3 of the present invention at the wide-angle end, the intermediate position and the telephoto end;

FIGS. 16A-16C are respective graphic representations of coma aberration according to Numerical Embodiment 3 of the present invention at the wide-angle end, the intermediate position and the telephoto end;

FIGS. 17A-17C are respective graphic representations of astigmatism aberration according to Numerical Embodiment 4 of the present invention at the wide-angle end, the intermediate position and the telephoto end;

FIGS. 18A-18C are respective graphic representations of distortion aberration according to Numerical Embodiment 4 of the present invention at the wide-angle end, the intermediate position and the telephoto end;

FIGS. 19A-19C are respective graphic representations of spherical aberration according to Numerical Embodiment 4 of the present invention at the wide-angle end, the intermediate position and the telephoto end;

FIGS. 20A-20C are respective graphic representations of chromatic aberration according to Numerical Embodiment 4 of the present invention at the wide-angle end, the intermediate position and the telephoto end.

DETAILED DESCRIPTION OF THE PREFERRED EMBODIMENTS

The above-mentioned and other technical contents, features and effects of the present invention will become apparent from the hereinafter set forth detailed description of preferred numerical embodiments of the present invention in combination with the drawings.

Figure 1:
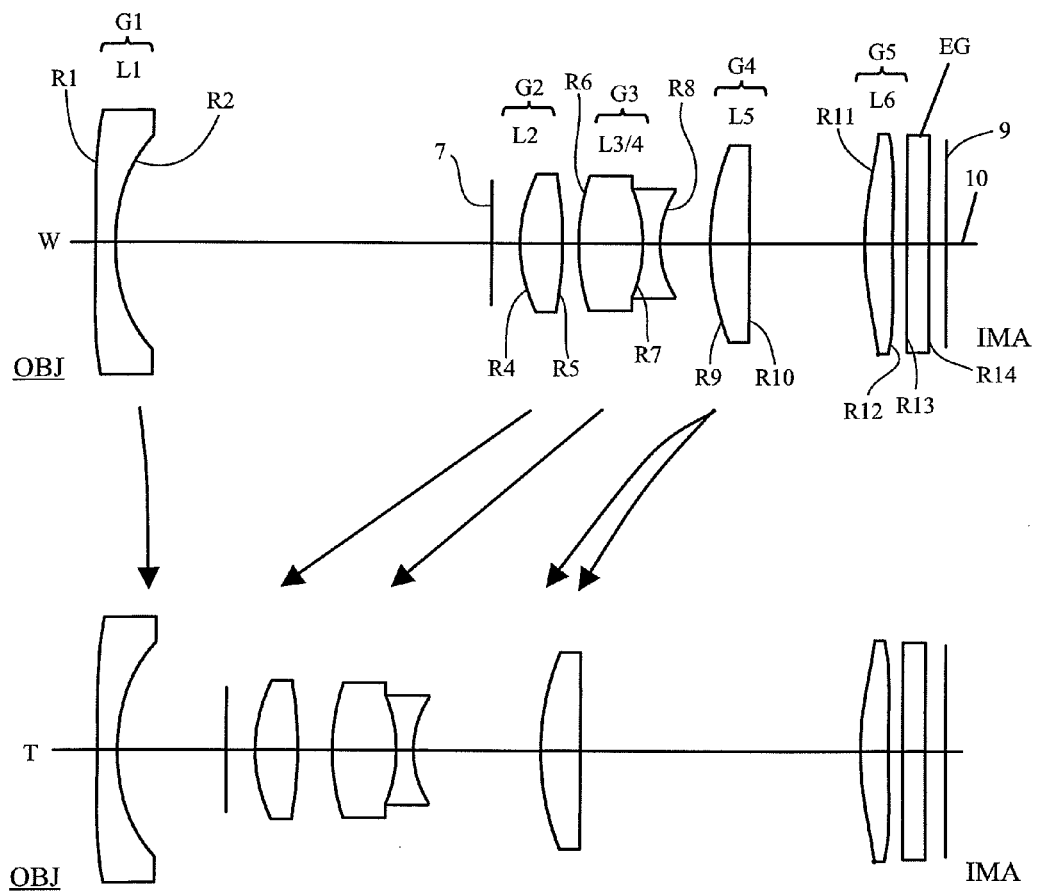
FIG. 1 is a schematic view illustrating lens positions of a zoom lens system of the present invention at a wide-angle end and a telephoto end.

The present invention provides a zoom lens system, which is used in an image pickup device or a photographic device for forming an image of an object onto an image sensor or a film. The lens construction of the present zoom lens system is illustrated in FIG. 1, in which symbol "W" denotes a wide-angle end, symbol "T" stands for a telephoto end, symbol "OBJ" denotes the object side, symbol "IMA" denotes the image side, symbol "EG" schematically denotes a glass element such as a low-pass filter or a cover glass on the image sensor, and reference numeral 10 denotes the optical axis of the present zoom lens system. As shown in FIG. 1, the present zoom lens system comprises, in order from the object side OBJ to the image side IMA, a first lens group G1 having negative refractive power, a second lens group G2 having positive refractive power, an aperture stop 7 disposed between the first and second lens groups G1, G2, a third lens group G3 having negative refractive power, a fourth lens group G4 having positive refractive power, a fifth lens group G5 having positive refractive power, and a glass member EG disposed adjacent to an image plane 9.

The present zoom lens system satisfies the following condition:

$$1.05 \leq \frac{f_W \cdot L_W}{f_T \cdot Y} \leq 1.53$$

where $f_W$ represents the focal length of the present zoom lens system at the wide-angle end, $f_T$ represents the focal length of the present zoom lens system at the telephoto end, Y represents a maximum diagonal length of the image plane, and $L_W$ represents a total length of the present zoom lens system at the wide-angle end which is defined as a distance from the vertex of a first surface of the first lens L1 on the object side OBJ to the image plane 9.

When zooming from the wide-angle end to the telephoto end, both the second and third lens groups G2, G3 of the present zoom lens system are moved toward the object side OBJ, and at the same time, the first lens group G1 is first moved independently toward the image side IMA and then toward the object side OBJ, so that the spacing between the first and second lens groups G1, G2 is decreased and the spacing between the second and third lens groups G2, G3 is increased. The fifth lens group G5 remains stationary during zooming.

The aperture stop 7, together with a shutter, is disposed in front of the second lens group G2 and thus between the first and second lens groups G1, G2. During zooming operation, the aperture stop 7 is moved together with the second lens group G2.

The fourth lens group G4 is movable for focusing on an object located within a normal photographing range, so that an image of the object is focused on the image sensor of the photographic device.

During zooming operation, the first lens group G1 may also be kept stationary. That is, the first lens group G1 does not contribute to the zooming action.

Preferably, in the present zoom lens system, the second, fourth and fifth lens groups G2, G4, G5 are all made of plastic materials.

By the employment of an arrangement of five lens groups that has a negative-positive-negative-positive-positive refractive power configuration, the present zoom lens system provides the advantages of small size, low cost and light weight as compared to the conventional designs.

The lens constructions of the present zoom lens system are provided below in detail. The first lens group G1 consists of one aspheric lens L1 having two aspheric surfaces. This lens L1 has a negative refractive power and has an Abbe number Vd not less than 63. The second lens group G2 consists of one aspheric lens L2 that has two aspheric surfaces and has a positive refractive power. The third lens group G3 consists of a biconvex lens L3 and a biconcave lens L4 cemented with each other to form a spherical cemented lens having a negative refractive power.

The fourth lens group G4 consists of one lens L5 movable along the optical axis 10 for focusing. During focusing, this lens L5 is moved independently toward the object side to approach the third lens group G3, whereby the spacing between the third and fourth lens groups G3, G4 is decreased. This lens L5 may be made of glass or plastic material. The fourth lens group G4 has a positive refractive power, and also has a compensating function to compensate for a shift of a focal plane due to a variation in magnification as well as a focus adjusting function. This focusing and compensating fourth lens group G4 may move together with the first and second lens groups G1, G2 during the zooming operation, and then independently move for effecting the focusing operation.

The fifth lens group G5 consists of one aspheric lens L6 having a positive refractive power. The aspheric lens L6 remains stationary relative to a lens barrel (not shown), and is preferably made of plastic materials.

The present zoom lens system further satisfies the following condition:

$$0.9 \leq \frac{L_W}{f_{L6}} \leq 1.3$$

where $f_{L6}$ represents the focal length of the aspheric lens L6 of the fifth lens group G5, and $L_W$ represents the total length of the present zoom lens system at the wide-angle end.

The aspheric surfaces of the aspheric lenses adopted by the present zoom lens system are expressed by the following formula:

$$z = \frac{\left(\frac{h^2}{r}\right)}{1 + \left[1 - (K+1)\left(\frac{h}{r}\right)^2\right]^{\frac{1}{2}}} + Ah^4 + Bh^6 + Ch^8 + Dh^{10} + Eh^{12}$$

where z represents displacement in the direction of the optical axis at the position of height h from the optical axis relative to the surface vertex; h represents a height of a point on the aspheric surface with respect to the optical axis; r is the curvature radius of the aspheric lens surface on the optical axis; K represents a cone constant; and A, B, C, D, and E are aspheric coefficients for fourth, sixth, eighth, tenth and twelfth order terms.

Four numerical embodiments of the present zoom lens system will be described in detail hereinafter.

Numerical Embodiment 1

FIGS. 2A-6C illustrate various aberrations generated by the present zoom lens system according to Numerical Embodiment 1, wherein FIGS. 2A-2C are respective graphic representations of astigmatism aberration at the wide-angle end, the intermediate position and the telephoto end, FIGS. 3A-3C are respective graphic representations of distortion aberration in the different three zooming positions, FIGS. 4A-4C are respective graphic representations of spherical aberration in the different three zooming positions, FIGS. 5A-5C are respective graphic representations of chromatic aberration in the different three zooming positions, and FIGS. 6A-6C are respective graphic representations of coma aberration in the different three zooming positions.

In these graphs, "2w" denotes a view angle. In FIGS. 2A-2C, "M" denotes a meridional plane and "S" denotes a sagittal plane. In FIGS. 4A-4C, "g" denotes a spectral g-line and "d" denotes a spectral d-line.

Numerical values of the component lenses of the present zoom lens system according to Numerical Embodiment 1 are shown in Data Table 1 given below. In Data Table 1 and other similar data tables provided hereinafter, "i" represents the order of the surface from the object side (including lens surfaces, the aperture stop 7 and the glass element EG), "Ri" represents the radius of curvature (mm) of the ith surface, "D" represents the ith member thickness or the distance (mm) between the ith surface and the (i+1)th surface, and "Nd" and "Vd" respectively represent the refractive index (d-line) and Abbe number (d-line) of the ith member.

DATA TABLE 1

| Surface (i) | Ri (mm) | D (mm) | Nd | Vd |
|---|---|---|---|---|
| R1 | −109.651 | 0.7 | 1.621477 | 70.00 |
| R2 | 7.196912 | 0.7 | | |
| aperture | ∞ | 1 | | |
| R4 | 5.162448 | 1.5 | 1.648894 | 49.02 |
| R5 | −13.8913 | 0.7 | | |
| R6 | 7.760394 | 2.256130831 | 1.416401 | 71.00 |
| R7 | −5.07732 | 0.6 | 1.70209 | 25.00 |
| R8 | 3.475283 | 1 | | |
| R9 | 9.384319 | 1.4 | 1.539703 | 27.74 |
| R10 | −387.699 | 1.5 | | |
| R11 | 10.76422 | 1 | 1.525279 | 55.95 |
| R12 | 53.02016 | 0.5 | | |
| R13 | ∞ | 0.8 | 1.516798 | 64.20 |
| R14 | ∞ | 0.8 | | |

According to Numerical Embodiment 1 of the present zoom lens system, with reference to FIG. 1, surfaces R1 and R2 of the first lens group G1, surfaces R4 and R5 of the second lens group G2 and surfaces R11 and R12 of the fifth lens group G5 are all configured to be aspheric surfaces. Aspheric coefficients for these aspheric surfaces are given in following Data Table 2, wherein K represents a cone constant, and A, B, C, D and E are aspheric coefficients for fourth, sixth, eighth, tenth and twelfth order terms.

DATA TABLE 2

| No | K | A | B | C | D | E |
|---|---|---|---|---|---|---|
| R1 | 0 | 0.000621 | 1.5811E−05 | −1.0068E−06 | 1.49102E−08 | 0 |
| R2 | 0 | 0.000639 | 5.1104E−05 | −8.52627E−07 | 0 | 0 |
| R4 | 0 | −0.00104 | 3.60825E−05 | −9.12556E−06 | −8.02445E−07 | 0 |
| R5 | 0 | −0.00029 | 0.000141125 | −3.10028E−05 | 8.82508E−07 | 0 |
| R11 | 0 | −0.00111 | −1.37258E−05 | 2.3379E−07 | 3.20048E−08 | 0 |
| R12 | 0 | −0.00135 | 1.33855E−05 | 0 | 0 | 0 |

Data Table 3 provided below shows variable spacings D1, D2, D3 and D4 between the five lens groups at the respective wide-angle end (W), the intermediate position (M) and the telephoto end (T) according to Numerical Embodiment 1, wherein D1 denotes a first variable spacing along the optical axis between the image-side surface R2 of the first lens group G1 and the object-side surface R4 of the second lens group G2, D2 denotes a second variable spacing along the optical axis between the image-side surface R5 of the second lens group G2 and the object-side surface R6 of the third lens group G3, D3 denotes a third variable spacing along the optical axis between the image-side surface R8 of the third lens group G3 and the object-side surface R9 of the fourth lens group G4, and D4 denotes a fourth variable spacing along the optical axis between the image-side surface R10 of the fourth lens group G4 and the object-side surface R11 of the fifth lens group G5. In addition, the focal lengths f of the present zoom lens system at the respective wide-angle end (W), the intermediate position (M) and the telephoto end (T) are also provided in Data Table 3.

DATA TABLE 3

| | D1 | D2 | D3 | D4 |
|---|---|---|---|---|
| W (f = 6.0) | 13.5314 | 0.56922 | 2.16389 | 3.19126 |
| M (f = 12.0) | 6.0881437 | 0.872345 | 3.38018 | 7.0437 |
| T (f = 17.3) | 3.4 | 1.22616 | 4.4171 | 10.14628 |

Numerical Embodiment 2

Figures 8A, 8B, 8C:
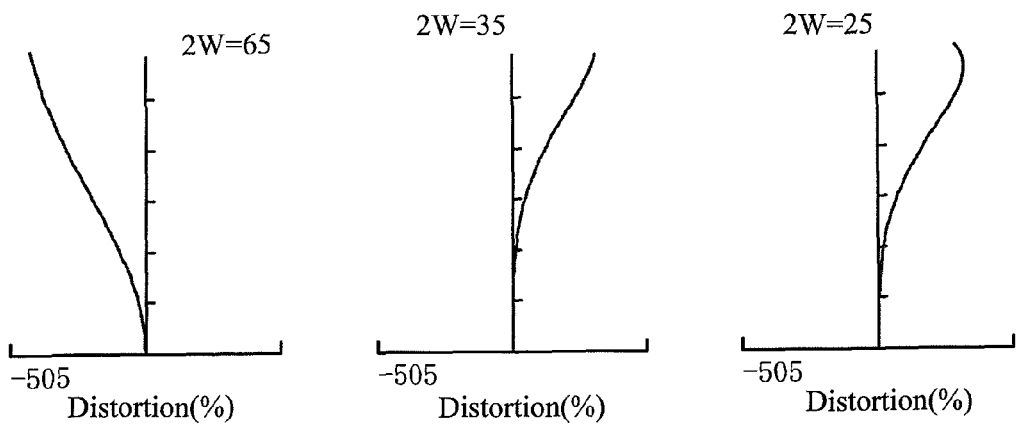
FIGS. 8A-8C are respective graphic representations of distortion aberration according to Numerical Embodiment 2 of the present invention at the wide-angle end, the intermediate position and the telephoto end.
Figures 9A, 9B, 9C:
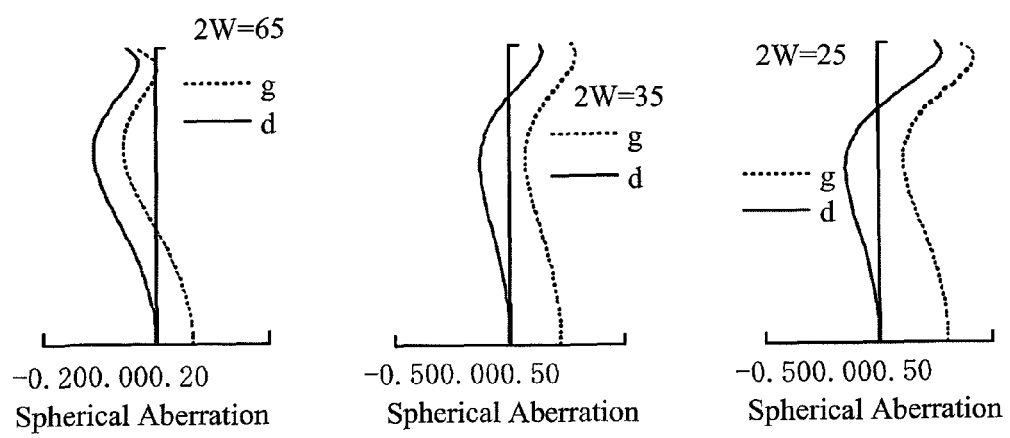
FIGS. 9A-9C are respective graphic representations of spherical aberration according to Numerical Embodiment 2 of the present invention at the wide-angle end, the intermediate position and the telephoto end.
Figures 10A, 10B, 10C:
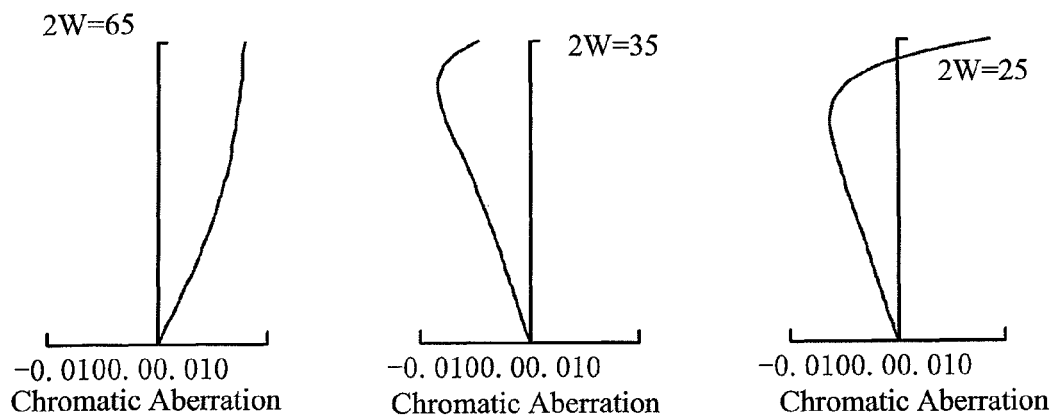
FIGS. 10A-10C are respective graphic representations of chromatic aberration according to Numerical Embodiment 2 of the present invention at the wide-angle end, the intermediate position and the telephoto end.
Figures 11A, 11B:
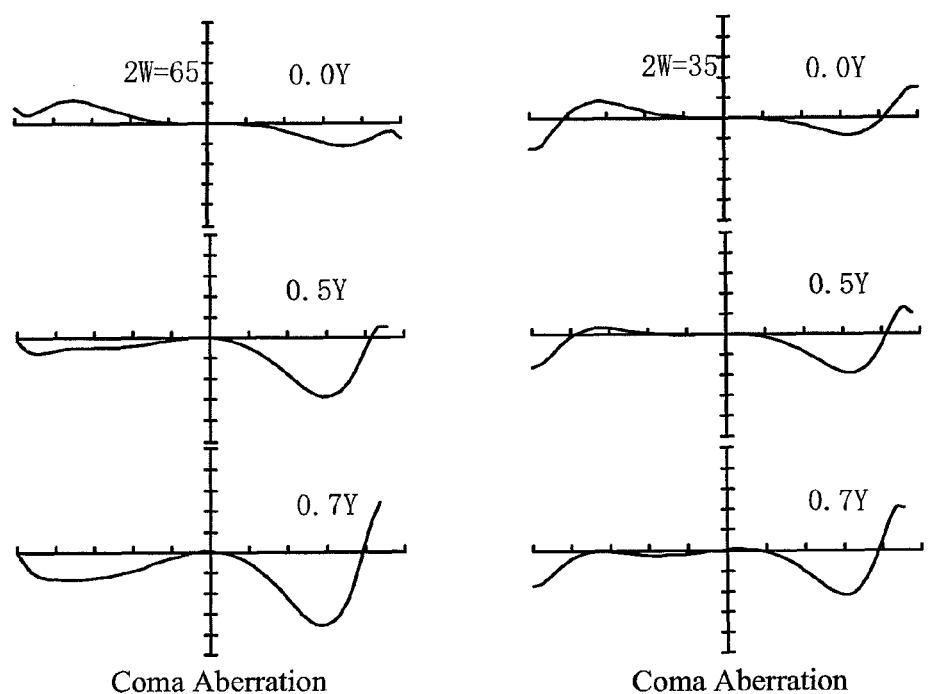

FIGS. 7A-11C illustrate various aberrations generated by the present zoom lens system according to Numerical Embodiment 2, wherein FIGS. 7A-7C are respective graphic representations of astigmatism aberration at the wide-angle end, the intermediate position and the telephoto end, FIGS. 8A-8C are respective graphic representations of distortion aberration in the different three zooming positions, FIGS. 9A-9C are respective graphic representations of spherical aberration in the different three zooming positions, FIGS. 10A-10C are respective graphic representations of chromatic aberration in the different three zooming positions, and FIGS. 11A-11C are respective graphic representations of coma aberration in the different three zooming positions.

Numerical values of the component lenses of the present zoom lens system according to Numerical Embodiment 2 are shown in Data Table 4 given below:

DATA TABLE 4

| Surface (i) | Ri (mm) | D (mm) | Nd | Vd |
|---|---|---|---|---|
| R1 | −140.054 | 0.7 | 1.57984 | 63.01 |
| R2 | 5.452477 | D1 | | |
| aperture | ∞ | 0.5 | | |

DATA TABLE 4-continued

| Surface (i) | Ri (mm) | D (mm) | Nd | Vd |
|---|---|---|---|---|
| R4 | 4.392006 | 1.4 | 1.729136 | 56.24 |
| R5 | −11.2859 | D2 | | |
| R6 | 7.944117 | 1.7 | 1.4725 | 71.00 |
| R7 | −3.10984 | 0.6 | 1.754346 | 28.99 |
| R8 | 3.271925 | D3 | | |
| R9 | 13.77669 | 1.25 | 1.58842 | 25.00 |
| R10 | −26.7724 | D4 | | |
| R11 | 26.75554 | 1 | 1.525279 | 55.95 |
| R12 | −24.5684 | 0.3 | | |
| R13 | ∞ | 0.8 | 1.516798 | 64.20 |
| R14 | ∞ | 0.8 | | |

According to Numerical Embodiment 2 of the present zoom lens system, with reference to FIG. 1, surfaces R1 and R2 of the first lens group G1, surfaces R4 and R5 of the second lens group G2 and surfaces R11 and R12 of the fifth lens group G5 are all configured to be aspheric surfaces. Aspheric coefficients for these aspheric surfaces are given in following Data Table 5.

DATA TABLE 5

| No | K | A | B | C | D | E |
|---|---|---|---|---|---|---|
| R1 | 0 | 0.000195 | 9.91168E−06 | 2.13514E−06 | −1.49647E−07 | 0 |
| R2 | 0 | 0.000462 | 7.56314E−05 | −1.27455E−07 | 9.10842E−07 | −9.6561E−08 |
| R4 | 0 | −0.00097 | −6.5626E−05 | −5.34257E−05 | 5.85218E−06 | 0 |
| R5 | 0 | 0.000293 | −7.55898E−05 | −2.19013E−05 | 1.93348E−06 | 0 |
| R11 | 0 | −0.00079 | −5.02264E−05 | 3.76782E−06 | 3.93864E−08 | 0 |
| R12 | 0 | −0.00107 | 5.57351E−05 | 0 | 0 | 0 |

Data Table 6 provided below shows variable spacings D1, D2, D3 and D4 between the five lens groups at the respective wide-angle end (W), the intermediate position (M) and the telephoto end (T) according to Numerical Embodiment 2.

DATA TABLE 6

| | D1 | D2 | D3 | D4 |
|---|---|---|---|---|
| W (f = 6.0) | 9.0654 | 0.63266 | 3.36294 | 0.89236 |
| M (f = 12.0) | 3.3608 | 0.9593 | 3.065 | 4.8677 |
| T (f = 17.3) | 1.5396 | 1.457858 | 5.54739 | 5.40948 |

Numerical Embodiment 3

Figures 13A, 13B, 13C:
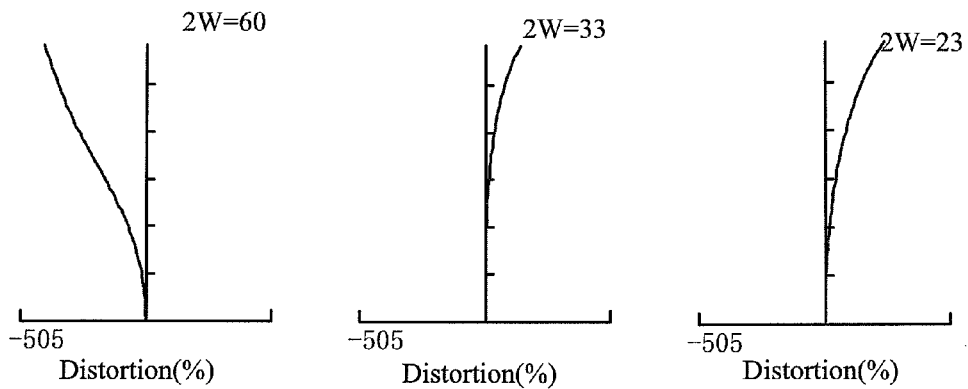
FIGS. 13A-13C are respective graphic representations of distortion aberration according to Numerical Embodiment 3 of the present invention at the wide-angle end, the intermediate position and the telephoto end.
Figures 14A, 14B, 14C:
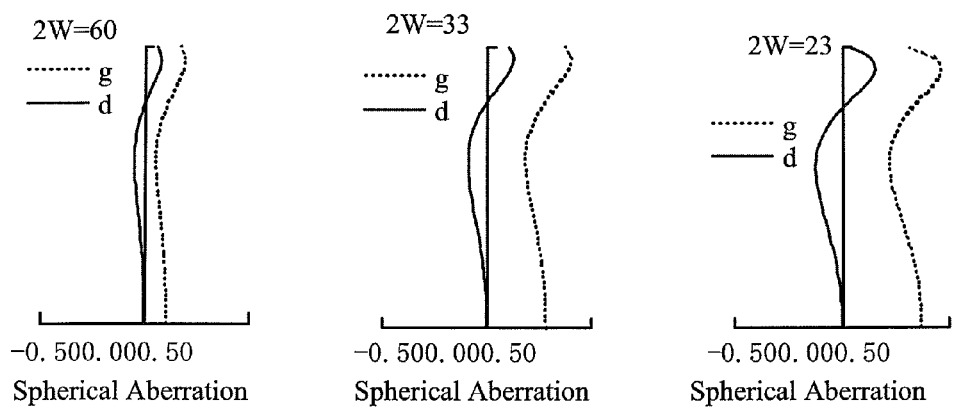
FIGS. 14A-14C are respective graphic representations of spherical aberration according to Numerical Embodiment 3 of the present invention at the wide-angle end, the intermediate position and the telephoto end.
Figures 15A, 15B, 15C:
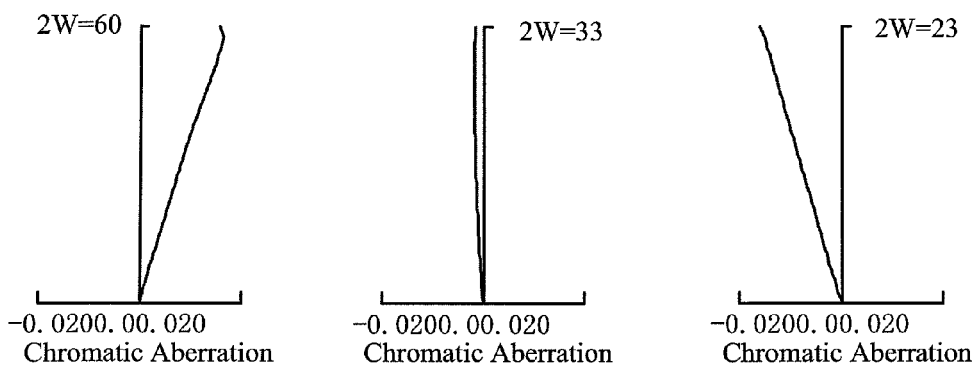
FIGS. 15A-15C are respective graphic representations of chromatic aberration according to Numerical Embodiment 3 of the present invention at the wide-angle end, the intermediate position and the telephoto end.

FIGS. 12A-6C illustrate various aberrations generated by the present zoom lens system according to Numerical Embodiment 3, wherein FIGS. 12A-12C are respective graphic representations of astigmatism aberration at the wide-angle end, the intermediate position and the telephoto end, FIGS. 13A-13C are respective graphic representations of distortion aberration in the different three zooming positions, FIGS. 14A-14C are respective graphic representations of spherical aberration in the different three zooming positions, FIGS. 15A-15C are respective graphic representations of chromatic aberration in the different three zooming positions, and FIGS. 16A-16C are respective graphic representations of coma aberration in the different three zooming positions.

Numerical values of the component lenses of the present zoom lens system according to Numerical Embodiment 3 are shown in Data Table 7 given below.

DATA TABLE 7

| Surface (i) | Ri (mm) | D (mm) | Nd | Vd |
|---|---|---|---|---|
| R1 | 42.55778 | 0.7 | 1.639609 | 63.01 |
| R2 | 6.216974 | 0.7 | | |
| aperture | ∞ | 1 | | |
| R4 | 5.186954 | 1.5 | 1.65034 | 57.15 |
| R5 | −12.9691 | 0.7 | | |
| R6 | 8.09533 | 2.263 | 1.487489 | 70.44 |
| R7 | −4.72741 | 0.6 | 1.7059 | 28.60 |
| R8 | 3.42446 | 1 | | |
| R9 | 9.969624 | 1.4 | 1.418728 | 25.00 |

DATA TABLE 7-continued

| Surface (i) | Ri (mm) | D (mm) | Nd | Vd |
|---|---|---|---|---|
| R10 | 143.2303 | 1.5 | | |
| R11 | 12.54017 | 1 | 1.525279 | 55.95 |
| R12 | 392.933 | 0.4 | | |
| R13 | ∞ | 0.8 | 1.516798 | 64.20 |
| R14 | ∞ | 0.8 | | |

According to Numerical Embodiment 3 of the present zoom lens system, with reference to FIG. 1, surfaces R1 and R2 of the first lens group G1, surfaces R4 and R5 of the second lens group G2 and surfaces R11 and R12 of the fifth lens group G5 are all configured to be aspheric surfaces. Aspheric coefficients for these aspheric surfaces are given in following Data Table 8.

DATA TABLE 8

| No | K | A | B | C | D | E |
|---|---|---|---|---|---|---|
| R1 | 0 | 0.000202 | 4.31908E−07 | −7.33666E−08 | −8.08793E−09 | 0 |
| R2 | 0 | 0.000124 | 2.99012E−05 | −2.03677E−06 | 0 | 0 |
| R4 | 0 | −0.00091 | 7.78508E−05 | −1.67419E−05 | 6.21925E−07 | 0 |
| R5 | 0 | 6.89E−06 | 0.000131683 | −1.42867E−05 | −3.61661E−07 | 0 |
| R11 | 0 | −0.00102 | −1.05172E−05 | −3.49368E−07 | 2.53708E−09 | 0 |
| R12 | 0 | −0.00144 | 7.7151E−06 | 0 | 0 | 0 |

Data Table 9 provided below shows variable spacings D1, D2, D3 and D4 between the five lens groups at the respective wide-angle end (W), the intermediate position (M) and the telephoto end (T) according to Numerical Embodiment 3.

DATA TABLE 9

| | D1 | D2 | D3 | D4 |
|---|---|---|---|---|
| W (f = 6.1) | 13.958 | 0.44262 | 3.31996 | 1.8381 |
| M (f = 12.0) | 6.051664 | 0.876264 | 5.47331 | 3.7084 |
| T (f = 17.1) | 3.22847 | 1.44955 | 7.35954 | 3.91532 |

Numerical Embodiment 4

Figure 21A:
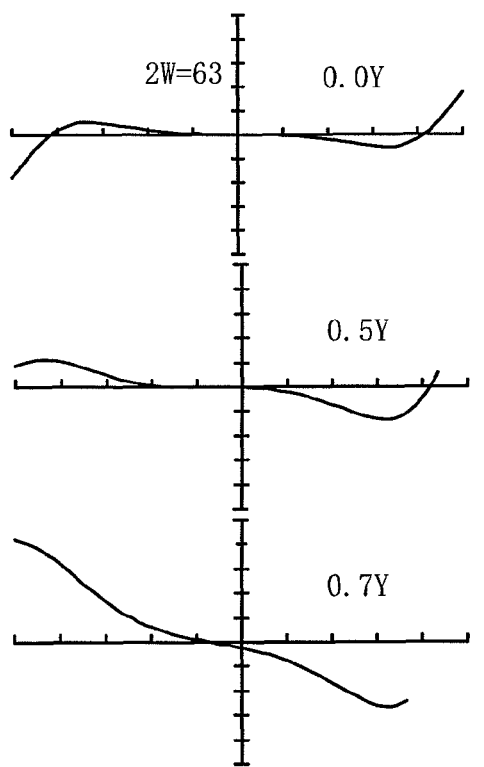
FIGS. 21A-21C are respective graphic representations of coma aberration according to Numerical Embodiment 4 of the present invention at the wide-angle end, the intermediate position and the telephoto end.
Figure 21B:
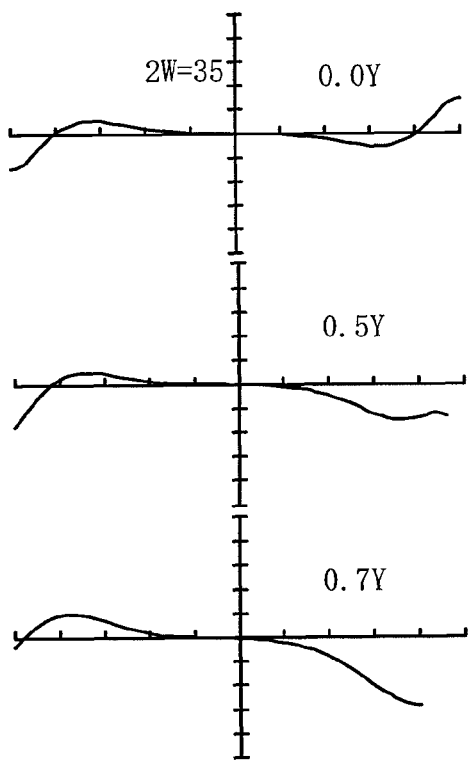
Figure 21C:
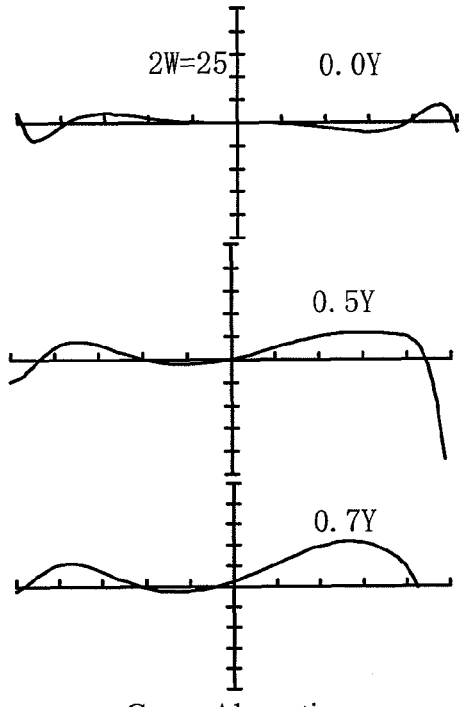

FIGS. 17A-21C illustrate various aberrations generated by the present zoom lens system according to Numerical Embodiment 4, wherein FIGS. 17A-17C are respective graphic representations of astigmatism aberration at the wide-angle end, the intermediate position and the telephoto end, FIGS. 18A-18C are respective graphic representations of distortion aberration in the different three zooming positions, FIGS. 19A-19C are respective graphic representations of spherical aberration in the different three zooming positions, FIGS. 20A-20C are respective graphic representations of chromatic aberration in the different three zooming positions, and FIGS. 21A-21C are respective graphic representations of coma aberration in the different three zooming positions.

Numerical values of the component lenses of the present zoom lens system according to Numerical Embodiment 4 are shown in Data Table 10 given below.

DATA TABLE 10

| Surface (i) | Ri (mm) | D (mm) | Nd | Vd |
|---|---|---|---|---|
| R1 | 426.6 | 0.7 | 1.60699 | 63.01 |
| R2 | 6.04318 | D1 | | |
| aperture | ∞ | 1 | | |
| R4 | 4.862835 | 1.5 | 1.72915 | 57.95 |
| R5 | −12.3086 | D2 | | |
| R6 | 7.177378 | 1.514 | 1.487489 | 70.44 |
| R7 | −3.83885 | 0.6 | 1.714823 | 30.28 |
| R8 | 3.333495 | D3 | | |
| R9 | 15.10223 | 1.3 | 1.72061 | 25.00 |
| R10 | 136.2852 | D4 | | |
| R11 | 14.61349 | 1 | 1.525279 | 55.95 |
| R12 | −120.325 | 0.3 | | |
| R13 | ∞ | 0.8 | 1.516798 | 64.20 |
| R14 | ∞ | 0.8 | | |

According to Numerical Embodiment 4 of the present zoom lens system, with reference to FIG. 1, surfaces R1 and R2 of the first lens group G1, surfaces R4 and R5 of the second lens group G2 and surfaces R11 and R12 of the fifth lens group G5 are all configured to be aspheric surfaces. Aspheric coefficients for these aspheric surfaces are given in following Data Table 11.

DATA TABLE 11

| No | K | A | B | C | D | E |
|---|---|---|---|---|---|---|
| R1 | 0 | 0.000231 | 9.04635E−06 | 8.87075E−07 | −8.14178E−08 | 0 |
| R2 | 0 | 0.000317 | 6.12346E−05 | −2.62896E−06 | 0 | 0 |
| R4 | 0 | −0.0006 | 3.43969E−05 | −2.14185E−05 | 7.21709E−07 | 0 |
| R5 | 0 | 0.000492 | 6.10018E−05 | −2.32487E−05 | 5.65941E−07 | 0 |
| R11 | 0 | −0.00174 | −2.39253E−05 | −1.15679E−07 | 6.1149E−08 | 0 |
| R12 | 0 | −0.00168 | −5.73294E−06 | 0 | 0 | 0 |

Data Table 12 provided below shows variable spacings D1, D2, D3 and D4 between the five lens groups at the respective wide-angle end (W), the intermediate position (M) and the telephoto end (T) according to Numerical Embodiment 4.

DATA TABLE 12

| | D1 | D2 | D3 | D4 |
|---|---|---|---|---|
| W (f = 6.1) | 9.81006 | 0.48436 | 3.62856 | 1.64447 |
| M (f = 12.0) | 3.874608 | 0.8371037 | 6.11628 | 3.26366 |
| T (f = 17.1) | 1.52787 | 1.370728 | 7.694145 | 3.887587 |

Values of the total length $L_W$ of the present zoom lens system at the wide-angle end, the focal length $f_T$ of the present zoom lens system at the telephoto end, the focal length $f_W$ of the present zoom lens system at the wide-angle end, the focal length $f_{L6}$ of the lens L6 of the fifth lens group G5 and the maximum diagonal length Y of the image plane for each of the Numerical Embodiments 1, 2, 3 and 4 are provided in Data Table 13.

DATA TABLE 13

| | $L_W$ | $f_T$ | $f_W$ | $f_{L6}$ | Y |
|---|---|---|---|---|---|
| Embodiment 1 | 30.00 | 17.12 | 6.02 | 25.5 | 7.5 |
| Embodiment 2 | 23.01 | 17.11 | 6.02 | 24.55 | 7.6 |
| Embodiment 3 | 30.01 | 17.12 | 6.06 | 25.51 | 7.0 |
| Embodiment 4 | 25.06 | 17.09 | 6.13 | 24.87 | 7.5 |

As described above, the present zoom lens system satisfies the following condition (a-1).

$$0.9 \le \frac{L_W}{f_{L6}} \le 1.3 \quad (a\text{-}1)$$

From Data Table 13 as provided above, it can be obtained that, for Numerical Embodiment 1, the ratio of $L_W$ to $f_{L6}$ is 1.18; for Numerical Embodiment 2, the ratio of $L_W$ to $f_{L6}$ is 0.94; for Numerical Embodiment 3, the ratio of $L_W$ to $f_{L6}$ is 1.18; and for Numerical Embodiment 4, the ratio of $L_W$ to $f_{L6}$ is 1.01. It is apparent that all these ratio values for the four numerical embodiments are well within the range of 0.9 to 1.3, which satisfies the above condition (a-1).

The present zoom lens system further satisfies the following condition (a-2).

$$1.05 \le \frac{f_W \cdot L_W}{f_T \cdot Y} \le 1.53 \quad (a\text{-}2)$$

From Data Table 13 provided above, it can be obtained that, for Numerical Embodiment 1, the ratio of $(f_W \cdot L_W)$ to $(f_T \cdot Y)$ is 1.41; for Numerical Embodiment 2, the ratio of $(f_W \cdot L_W)$ to $(f_T \cdot Y)$ is 1.06; for Numerical Embodiment 3, the ratio of $(f_W \cdot L_w)$ to $(f_T \cdot Y)$ is 1.52; and for Numerical Embodiment 4, the ratio of $(f_W \cdot L_W)$ to $(f_T \cdot Y)$ is 1.20. It is apparent that all these ratio values for the four numerical embodiments are within the range of 1.05 to 1.53, which satisfies the above condition (a-2).

Further, from FIGS. 2A-21C that illustrate various aberrations generated by the present zoom lens system according to the four numerical embodiments, it can be seen that various aberrations have been well corrected by the combination of aspheric lenses and spherical lenses of the present invention. Therefore, a high level of image performance has been obtained by the present zoom lens system while providing a compact configuration.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens system, in order from an object side to an image side along an optical axis, comprising:
   a first lens group having negative refractive power;
   a second lens group having positive refractive power;
   a third lens group having negative refractive power;
   a fourth lens group having positive refractive power; and
   a fifth lens group having positive refractive power;
   wherein, during zooming of the zoom lens system from a wide-angle end to a telephoto end for changing a focal length thereof, the second and third lens groups are moved independently toward the object side in such a manner that a spacing between the second and third lens groups increases and a spacing between the first and second lens groups decreases; and wherein the zoom lens system satisfies the following condition:

$$1.05 \leq \frac{f_W \cdot L_W}{f_T \cdot Y} \leq 1.53$$

where $f_W$ represents the focal length of the zoom lens system at the wide-angle end, $f_T$ represents the focal length of the zoom lens system at the telephoto end, Y represents a maximum diagonal length of an image plane, and $L_W$ represents a total length of the zoom lens system at the wide-angle end which is defined as a distance from the vertex of a first surface of the first lens on the object side to the image plane.

2. The zoom lens system as claimed in claim 1, wherein the fifth lens group comprises an aspheric lens satisfying the following condition:

$$0.9 \leq \frac{L_W}{f_{L6}} \leq 1.3$$

where $f_{L6}$ represents the focal length of the aspheric lens of the fifth lens group, and $L_W$ represents the total length of the zoom lens system at the wide-angle end.

3. The zoom lens system as claimed in claim 1, wherein the first lens group comprises an aspheric lens having two aspheric surfaces, the aspheric lens of the first lens group having an Abbe number equal to or larger than 63.

4. The zoom lens system as claimed in claim 1, wherein, during zooming from the wide-angle end to the telephoto end, the first lens group is first moved independently toward the image side and then moved toward the object side.

5. The zoom lens system as claimed in claim 1, wherein the first lens group remains stationary during zooming.

6. The zoom lens system as claimed in claim 1, wherein the second lens group comprises an aspheric lens having two aspheric surfaces.

7. The zoom lens system as claimed in claim 1, wherein the third lens group comprises a biconvex lens and a biconcave lens cemented with each other to form a cemented lens.

8. The zoom lens system as claimed in claim 1, wherein the fourth lens group is a focusing lens group, the fourth lens group being moved independently toward the object side to approach the third lens group for focusing, whereby the spacing between the third and fourth lens groups is decreased.

9. The zoom lens system as claimed in claim 8, wherein the fourth lens group is moved together with the first and second lens groups during zooming, and then moved independently for focusing.

10. The zoom lens system as claimed in claim 8, wherein the fourth lens group consists of a single lens.

11. The zoom lens system as claimed in claim 1, wherein the fifth lens group remains stationary during zooming.

12. A zoom lens system, in order from an object side to an image side along an optical axis, comprising:
   a first lens group having negative refractive power;
   a second lens group having positive refractive power;
   a third lens group having negative refractive power;
   a fourth lens group having positive refractive power; and
   a fifth lens group having positive refractive power;
   wherein, during zooming of the zoom lens system from a wide-angle end to a telephoto end for changing a focal length thereof, the second and third lens groups are moved independently toward the object side in such a manner that a spacing between the second and third lens groups increases and a spacing between the first and second lens groups decreases; wherein the fourth lens group is a focusing lens group, and wherein the fifth lens group comprises an aspheric lens satisfying the following condition:

$$0.9 \leq \frac{L_W}{f_{L6}} \leq 1.3$$

where $f_{L6}$ represents the focal length of the aspheric lens of the fifth lens group, and $L_W$ represents the total length of the zoom lens system at the wide-angle end.

13. The zoom lens system as claimed in claim 12, wherein the zoom lens system satisfies the following condition:

$$1.05 \leq \frac{f_W \cdot L_W}{f_T \cdot Y} \leq 1.53$$

where $f_W$ represents the focal length of the zoom lens system at the wide-angle end, $f_T$ represents the focal length of the zoom lens system at the telephoto end, Y represents a maximum diagonal length of an image plane, and $L_W$ represents a total length of the zoom lens system at the wide-angle end which is defined as a distance from the vertex of a first surface of the first lens on the object side to the image plane.

14. The zoom lens system as claimed in claim 12, wherein the first lens group comprises an aspheric lens having two aspheric surfaces, the aspheric lens of the first lens group having an Abbe number equal to or larger than 63.

15. The zoom lens system as claimed in claim 12, wherein, during zooming from the wide-angle end to the telephoto end, the first lens group is first moved independently toward the image side and then moved toward the object side.

16. The zoom lens system as claimed in claim 12, wherein the first lens group remains stationary during zooming.

17. The zoom lens system as claimed in claim 12, wherein the second lens group comprises an aspheric lens having two aspheric surfaces.

18. The zoom lens system as claimed in claim 12, wherein the third lens group comprises a biconvex lens and a biconcave lens cemented with each other to form a cemented lens.

19. The zoom lens system as claimed in claim 12, wherein, during focusing, the fourth lens group is moved independently toward the object side to approach the third lens group, whereby the spacing between the third and fourth lens groups is decreased.

20. The zoom lens system as claimed in claim 19, wherein the fourth lens group is moved together with the first and second lens groups during zooming, and then moved independently for focusing.

21. The zoom lens system as claimed in claim 19, wherein the fourth lens group consists of a single lens.

22. The zoom lens system as claimed in claim 12, wherein the fifth lens group remains stationary during zooming.

\* \* \* \* \*